United States Patent [19]

Kawanami et al.

[11] Patent Number: 5,409,415

[45] Date of Patent: Apr. 25, 1995

[54] SHOT METHOD

[75] Inventors: Toshio Kawanami; Hiroshi Ohnishi, both of Sakai; Hiroyuki Matsumura, Shinnanyo; Michiyuki Aimoto, Kudamatsu; Toshihiko Arakawa, Shinnanyo; Michiharu Ogai, Hikari, all of Japan

[73] Assignees: Nikkato Corp., Osaka; Tosoh Corporation, Yamaguchi, both of Japan

[21] Appl. No.: 83,037

[22] Filed: Jun. 29, 1993

[30] Foreign Application Priority Data

| | | |
|---|---|---|
| Jul. 2, 1992 [JP] | Japan | 4-197408 |
| Apr. 1, 1993 [JP] | Japan | 5-075639 |

[51] Int. Cl.$^6$ .................................... B24C 11/00
[52] U.S. Cl. ........................ 451/39; 51/307; 51/309
[58] Field of Search ............... 51/319, 320, 321, 307, 51/309

[56] References Cited

U.S. PATENT DOCUMENTS

| | | | |
|---|---|---|---|
| Re. 32,449 | 6/1987 | Claussen et al. | 501/103 |
| 3,929,498 | 12/1975 | Hancock et al. | 106/57 |
| 3,939,613 | 2/1976 | Ayers | 51/320 |
| 4,035,962 | 7/1977 | Ayers | 51/308 |
| 5,011,673 | 4/1991 | Kriechbaum et al. | 423/608 |
| 5,188,991 | 2/1993 | Kriechbaum et al. | 501/103 |

FOREIGN PATENT DOCUMENTS

| | | |
|---|---|---|
| 0129188 | 6/1984 | European Pat. Off. |
| 0314939 | 10/1988 | European Pat. Off. |
| 0351827A3 | 1/1990 | European Pat. Off. |

OTHER PUBLICATIONS

"Zirshot and Zirblast Fused Ceramic Beads Satisfy Most Impact Treatment Markets"; Amour, et al.; Finishing vol. 12, No. 4 (Apr. 1988).

Werner et al., Wirkung das Kugelstrahlens auf das Lochkorrosionseverhalten austenitischer CrNi(Mo)-Stahle, pp. 175–187 Korrosion, Dresden 22, Apr. 1991 (English abstract).

"Controlled Shot-peening: Cold Working to Improve Fatigue Strength", Heat Treatment, Aug. 1987, by James Harrison, pp. 16–18.

"Use Shot Peening to Toughen Welds", Welding Design & Fabrication, Sep. 1985, pp. 68–70, By Tom Floyd.

Optimization of Shot Peening to Improve the Fatigue Strength of Ti–6al–4v, H. E. Franz et al., Central Laboratory, Ottobrunn, W. Germany, pp. 439–446.

Shot-Peening: Verformen und Verguten mit Hochster Prazision, R. Rusterholtz, St. Gallen, Schweiz, Mechanische Bearbeitung, pp. 269–271 Jun. 1991.

Role of Shot-peening on Hydrogen Embrittlement of a Low-Carbon Steel and a 304 Stainless Steel, Journal of Materials Science 26 Jan. 1991 A. M. Brass et al., pp. 4517–4526.

Lanteri et al. Tetragonal Phase in the system $ZrO_2$–$Y_2O_3$, Advances in Ceramics, vol. 12, p. 119 (The American Ceramics Society, Inc., Jun. 1984.

Tsukuma et al. Thermal and Mechanical, Thermal and Electrical Properties of $Y_2O_3$ Stabilized Tetragonal Zirconia Polycrystals, pp. 382–390. Table 1 and FIGS. 3–10. (The American Ceramics Society, Inc., Jun. 1984).

Esper et al. Mechanical, Thermal, and Electrical Properties in the System of Stabilized $ZrO_2(Y_2O_3)/\alpha$–$Al_2O_3$ pp. 528–536, FIGS. 1–7. (The American Ceramics Society, Inc., Jun. 1984).

*Primary Examiner*—Robert A. Rose
*Attorney, Agent, or Firm*—Nixon & Vanderhye

[57] ABSTRACT

A shot method wherein a shot media based on zirconia composed of a sintered body of partially stabilized zirconia, of which a substantial quantity of the shot media pass through a sieve of normal sizes with apertures of 2.36 mm or less, of which the mean relative density against the theoretical density of zirconia is not less than 95%, of which the mean grain size is not more than 1.0 $\mu$m, and which has a mean Vickers hardness of not less than 1,000 kgf/mm$^2$, is shot to a work surface.

7 Claims, No Drawings

SHOT METHOD

This invention relates to a shot method employed in shot peening, shot blasting and the like.

As an artificial shot media which is employed in shot peening for preventing stress corrosion cracking of steel, for providing wear resistance of a mirror finished surface of various metals or alloy, for providing an ornament effect to a surface of a work as a substitute of buffing and the like, and in shot blasting for removing rust formed on a surface of a work, old pained film, lining coat, sprayed coating, plated coat and the like, for finishing such as removing slag after welding, deburring a resin product after forming and for providing random asperity to a surface of a metal basis material before various coatings and the like, random edged particles of fused alumina, silicon oxide, steel grit, cast iron grit and the like or spherical particles of steel shot, glass beads, alumina-ball and the like, are known.

In recent years, a shot peening and the like employing a shot media having a small particle diameter of a material other than metals such as glass, zircon and alumina, is performed for providing wear resistance of a mirror finished surface of various alloys or for providing ornament effect of a mirror finished surface as a substitute of buffing.

As characteristics of a shot media having a small particle diameter which is employed in shot peening or shot blasting, it is preferred that the media is provided with a large specific gravity as in a shot media having a large particle diameter, and a large mechanical strength, and is hard to be shattered by the impact of shot.

In recent times a shot media having a particle size of not more than 3 mm, or not more than 0.3 mm in case of especially high accuracy, is required to meet a requirement for higher performance with respect to complexity of the shape of the work or the surface property such as the smoothness, the dimension accuracy, the reflectivity and the gloss of surface.

Fused alumina or silicon oxide are employed in shot blasting for removing rust or burr, since they are excellent in the cutting performance compared with that of a metal shot media. However, especially silicon oxide is apt to break since it is of a needle crystal, and reuse there of is difficult. When the surface of a work of stainless steel, aluminum alloy and the like is treated by steel grit or cast iron grit, the "inlaying phenomena" are caused wherein the shot media is embedded into the surface or pierces therein, and rust is generated at this portion or rust is generated on the shot media per se. Glass beads form a thin glossy mat-finished surface on the work and is excellent in the impact effect. However, the smaller the beads diameter, the more the beads are apt to be provided with static electricity, and the beads adhere to the inside of an equipment. Or, the shot media per se is shattered by a single shot and can not be reused, since the mechanical strength thereof is small.

A shot media of zircon or alumina is excellent in the impact effect compared with that of glass beads. However, the mechanical strength thereof is not so excellent that the shot media can be repetitively used, since the fracture toughness is low. Further, the specific gravity thereof is small. Therefore, when the shot media diameter is small, the shot media adheres to the inside of an equipment by static electricity. Or, it is not possible to perform the shot with respect to a work under a constant condition, due to shot powders worn by the shot or shattered junk.

It is an object of the present invention to solve the above problems and to provide a shot media wherein rust is not generated on the shot media per se even when it is employed in a wet form, the surface of the work after the shot is more smooth than in glass beads, the specific gravity thereof is larger than that of zircon or alumina shot agent, the shot agent is hard to adhere to the inside of a shot equipment by static electricity, the shot media is excellent in the impact effect and the removal effect in polishing, grinding and the like, no inlaying phenomenon is caused on the work, the shot media is provided with a sufficient mechanical strength and is not crushable, an after-treatment process of a work such as acid pickling is not necessary since rust is not generated on the work, the shot media is provided with high wear resistance, and the shot agent can maintain constant shot parameters and treatment with respect to the work even when the shot agent is repetitively utilized.

According to an aspect of the present invention, there is provided a shot method wherein a shot media based on zirconia composed of a sintered body of the partially stabilized zirconia of which substantial total quantity is under a sieve of normal sizes of apertures of 2.36 mm, of which mean relative density is not less than 95%, of which mean grain size is not more than 1.0 $\mu$m, and of which mean Vickers hardness is not less than 1,000 kgf/mm$^2$, is shot to a work.

In this specification, the "mean grain size" with respect to a sintered body, indicates a diameter of a circle having an area the same with another area measured by performing an image analysis on a size of each grain observed by a scanning electron microscope, when the shot media based on zirconia sample receives a thermal etching.

"Vickers hardness" indicates a value measured by "Testing method for Vickers hardness number of a high performance ceramics" prescribed by JIS R 1610. The testing method is as follows. A Vickers hardness tester or a micro Vickers hardness tester is employed. An indentation is formed on a mirror-finished surface of a sample employing a square-based pyramidal diamond indenter having included face angles of 136 degree, under an applied load whereby the fracture of sample is not caused. The value is calculated by the following equation from a surface area of permanent indentation obtained from the diagonal of indentation and the applied load. The applied load is selected from a range of 50 gf to 10 kgf in accordance with the size of sample, and the loading time is determined to be ten seconds.

$$\text{Vickers hardness (kgf/mm}^2\text{)} = 1.8544 \, P/S$$

where P is the applied load (kgf) and S is the surface area of permanent indentation (mm$^2$).

"Compressive strength" of a spherical shot media is a value provided by the following method.

In case that the particle size (d infra) of the spherical shot media is larger than 0.2 mm, based on "Testing method for compressive strength of high performance ceramics" prescribed by JIS R 1608, the sample is set between steel blocks having a thickness of not less than 10 mm which is heat-treated to Rockwell hardness of HRC 60±3, of a testing machine for strength characteristic prescribed by JIS B 7733, the load is applied at the crosshead speed of 0.5 mm/min, and the load is measured when the sample is fractured. In case that the particle diameter (d infra) of the spherical shot media is not larger than 0.2 mm, a compression test mode of the testing machine for strength characteristic adopting a micro compression and measuring system of displacement, is employed, the load is applied on the sample fixed between the top pressure indenter and the bottom pressure plate by an electromagnetic force at a constant increase rate, and the load is measured when the sample is fractured. However, in case that the sample is not fractured even when the load is applied thereon up to 500 gf, a load is measured when the sample deforms by 10%. Further, the compressive strength is calculated by employing the following equation (Hiramateu, Oka and Kiyama "Journal of Mining and Metallurgical Institute", 81.10.24 (1965)).

Compressive strength $(kgf/mm^2) = 2.8P/\pi d^2$ where P is a measured value of the load (kgf) and d is a mean of a maximum size and a minimum size of a projected section in view from above when the shot media based on zirconia sample is disposed on a horizontal plane (mm).

"Diameter" of the spherical shot media indicates a height of the sample disposed on a zirconia plate in case of measuring the following impact strength. That is, the diameter indicates a distance between the zirconia plate and a plane, when the plane is lowered from above sample while maintaining a parallel state with a face of zirconia plate and the plane touches the sample.

"Impact strength" is provided as follows. The spherical shot media is placed on a zirconia plate having the Young's modulus of $2.1 \times 10^4$ kgf/mm$^2$, a weight of 120 g is dropped thereon, the drop height is elevated, the height whereby the shot media is fractured, is measured and the impact strength is provided by the following equation.

Impact strength $(kgf/mm^2) = 0.12 \times h/V$ where h is the height (mm) whereby the shot media is fractured and V is a volume of a sphere having a diameter which is equal to a height of the shot media disposed on the zirconia plate, or a distance between the zirconia plate and the plane, when the plane is lowered from above the sample while maintaining the parallel state with the zirconia plate and the plane touches the sample (mm$^3$).

"Sphericity" of the spherical shot media is provided by the following equation.

Sphericity $= (4\pi \times$ area of projected section$)/($peripheral length$)^2$.

A detailed explanation will be given of this invention as follows.

(a) Size of shot media

The size of the shot media based on zirconia should be defined by a condition wherein substantially a total quantity thereof is under a sieve of nominal sizes of apertures of 2.36 mm, that is, a substantial total quantity thereof should pass through the sieve of nominal sizes of apertures of 2.36 mm (for instance, a nominal size of standard sieves of metal wire cloth of 2.36 prescribed by JIS Z 8801).

The larger the size of shot media, the higher the impact effect. However, when the size of shot media is too large, in shot peening, the surface of the work becomes rugged and strain is caused thereon. Therefore, it is necessary to make the surface of the work smooth by performing an electrolytic polishing treatment after the shot operation. In shot blasting, a number of a shot media which is shot per unit time is reduced and it is not possible to completely remove scale, the sprayed coating or the like. On the other hand, the smaller the size of shot media, the more easily the shot media can meet the high degree of requirement of recent years with respect to the complexity of the shape of the work or the surface condition such as the smoothness, the dimension accuracy, the reflectivity and the gloss of surface. However, in shot blasting, when the shot media is too small, the classification of the rust or the metal powder removed from the work by the shot operation and the shot media, becomes difficult. It is more preferable that the size of shot media is in a range wherein a substantial total quantity of shot media is over a sieve of nominal sizes of apertures of 0.02 mm and under a sieve of nominal sizes of apertures of 2 mm.

The effect of the shot operation which is given to the work, is governed by conditions of the shot rate, the shot distance, the shot angle and the like. Therefore, it is necessary to control the shot media size and the distribution of the shot media by a classifier or by a sieve, in consideration of a balance between the shape and material of the work and the above shot conditions.

(b) Density

The mean relative density against the theoretical density of the zirconia is not less than 95%.

When the mean relative density against the theoretical density is smaller than 95%, the wear resistance and the mechanical strength are poor, the shot media is shattered when it is shot on the surface of the work, the shot media wears after the repetitive shot, and the worn and shattered shot media adheres to the inside of an equipment by static electricity in the shot operation. It is more preferable when the mean relative density against the theoretical density is not less than 97%. The density of a sintered body can be measured by "Testing method for specific gravity of artificial abrasives" prescribed by JIS R 6125.

As for the shape of the shot media, there are a grit of a random shape and a spherical shot. Since the shot is provided with a large effect of impinging the surface, strain is apt to be caused on the crystal particle by its reactive force when the work is a metal. The larger the sintered density of the shot media, the larger the degree of strain. The sintered density of the shot media based on zirconia is approximately 6, which is comparatively large compared with 2.5 of glass or 3.8 of alumina and is near to 7 of steel. Therefore, the degree of strain is magnified. Accordingly, it is necessary to adjust the shape of the shot media, the shot pressure, the shot distance, the shot angle and the nozzle size, such that the work is provided with the "arc height value" suitable for the material thereof, by employing an Almen strip and a gauge.

(c) Mean grain size

The mean grain size of a zirconia of the shot media based on zirconia should be not more than 1.0 μm.

When the mean grain size of the zirconia based shot media exceeds 1.0 μm, in case wherein the shot operation is performed in a state of high shot pressure, the tetragonal zirconia is apt to transform into the monoclinic zirconia by the stress, which increases the consumption of the shot media and deteriorates the surface condition of the work, which is not preferable. It is more preferable that the mean grain size is not more than 0.7 μm. However, the lower limit of the mean grain size of a normally provided sintered body based on zirconia is approximately 0.2 μm when the mean relative density against the theoretical density is not less than 95%.

(d) Vickers hardness

The mean Vickers hardness of the shot media based on zirconia should be not less than 1,000 kgf/mm², and particularly preferable in a range of 1,100 to 1,500 kgf/mm².

When the mean Vickers hardness is below 1,000 kgf/mm², the working speed of the work is retarded and the consumption or the size reduction ratio of the shot media becomes considerable, which is not preferable.

Further, when the Vickers hardness exceeds 1,500 kgf/mm², the consumption of the work becomes large depending on the material of the work, which is not preferable.

(e) Compressive strength

It is preferable that the compressive strength of the shot media based on zirconia is not less than 40 kgf/mm².

When the mean compressive strength is not less than 40 kgf/mm², the wear resistance and the mechanical strength of the shot media are high. The shot media based on zirconia is hard to crush when it is shot on the surface of the work, and the shot media based on zirconia is hard to wear even when it is shot repetitively.

(f) Tetragonal phase content in polycrystalline zirconia

It is preferable that the shot media based on zirconia contains not less than 70 mole % of tetragonal phase content in polycrystalline zirconia.

The sintered body based on zirconia having not less than 70 mole % of tetragonal phase content in polycrystalline zirconia is particularly provided with the toughness and the strength. It is more preferable that the above condition is satisfied and the monoclinic phase content in polycrystalline zirconia is less than 5 mole % and the cubic phase content in polycrystalline zirconia is less than 30 mole % among the zirconia crystal phase.

The respective crystal phase contents in the zirconia polycrystal is provided as follows. The section of the sintered body is finished to a mirror finished surface by a diamond wheel having the particle diameter of 1 to 5 μm, the area intensities are provided by diffraction patterns of the respective crystal phases by the X-ray diffraction method of the surface and the results are put into the following equations.

$$M(\text{monoclinic zirconia mole \%}) = [\{I_{m(11\bar{1})} + I_{m(111)}\}/\{I_{m(11\bar{1})} + I_{m(11\bar{1})} + I_{c+t(111)}\}] \times 100$$

$$C(\text{cubic zirconia mole \%}) = [I_{c+t(111)}/\{I_{m(111)} + I_{m(11\bar{1})} + I_{c+t(111)}\}] \cdot \times [I_{c(400)}/\{I_{c(400)} + I_{t(400)} + I_{t(004)}\}] \times 100$$

$$T(\text{tetragonal zirconia mole \%}) = 100 \times M \times C$$

where the suffix m designates the monoclinic zirconia, the suffix c, the cubic zirconia, the suffix t, the tetragonal zirconia and the suffix c+t, both of the cubic zirconia and the tetragonal zirconia; the inside of () designates Miller index and I added with these suffixes designate the area intensity in respective Miller index of respective crystal phase.

(g) component

Rare earth oxides such as MgO, CaO, $Y_2O_3$, and $CeO_2$ are much employed as stabilizers for the sintered body based on zirconia. In order that the tetragonal phase content in polycrystalline zirconia is not less than 70 mol %, it is preferable that, for instance, in case of $Y_2O_3$, the mole ratio of $Y_2O_3/ZrO_2$ is in a range from 1.5/98.5 to 4.0/96.0. When the mole ratio is less than 1.5/98.5, the monoclinic zirconia increases and the tetragonal zirconia decreases, and a high-strength shot media can not be provided by employing transformation of the tetragonal zirconia into the monoclinic zirconia. On the other hand, when the mole ratio exceeds 4.0/96.0, the tetragonal zirconia decreases and the cubic zirconia becomes the major component, and, therefore, the grain size becomes large, the toughness is lowered and the strength is lowered. Further, other than $ZrO_2$ and $Y_2O_3$, $Al_2O_3$, $TiO_2$, $SiO_2$, MgO, Cao, a rare earth oxide and the like may be coexistent. Among these, the substance whose melting point is low, as in $Al_2O_3$, $TiO_2$, $SiO_2$ and the like, lowers the sintering temperature of zirconia due to its low melting point. Further, MgO, Cao, $CeO_2$ or the like dissolves into the zirconia crystal constituting a solid solution and lowers the sintering temperature, which is advantageous in manufacturing the shot media. It is preferable that these substances are employed in a range of 0.05 to 30 wt %, with respect to a total of $ZrO_2$ and $Y_2O_3$. When the content is larger than 30 wt %, the inherent property of zirconia is lowered as in lowering of the toughness, the shot media is shattered in the shot operation and the quantity of wear loss increases.

(h) Impact strength

It is preferable that the mean impact strength of the shot media based on zirconia is not less than $7 \times D^{-0.95}$ kgf/mm² (D is the mean diameter (mm) of the shot media). When the condition is satisfied, cracks of the shot media decrease and the quantity of wear loss decreases. When the impact strength is lower than this criteria, the wear resistance and the mechanical strength are low, the shot media is apt to shatter when it is shot on the surface of the work and the shot media is apt to wear by the repetitive shot operation. When the impact strength satisfies this value, the condition wherein the above mean compressive strength is not less than 40 kgf/mm², is satisfied.

(i) Sphericity

When the shot media is spherical, it is preferable that the mean sphericity is not less than 0.9.

Although there is no restriction on the shape of the shot media of this invention, it is preferable that the shape is similar to a sphere, when the uniformity of the quantity of shots and the uniformity of the motion of the shot media are the problems. It becomes easy to make constant the quantity of shots by rendering the mean sphericity to be not less than 0.9, which reduces the roughness and the strain of the surface of the work, and the product can be provided with an excellent ornament effect. It is not necessary that the shot media employed in shot blasting is spherical in case that there is no requirement for the shot quantity. The shot media may be provided with a grit-like form having a random and edged shape as in the conventional shot media.

The invented shot media based on zirconia can be manufactured as follows. The zirconia based powders provided by the fusing method, the hydrolysis method, the neutralization-coprecipitation method, the hydrolysis-neutralization method, the hydrothermal-oxidation method, the thermal decomposition method, the alkoxide hydrolysis method and the like, are granulated by selecting a granulating method from the tumbling granulating method, the extrusion granulating method, the compression granulating method, the agitation granulation method, the liquid phase granulating method and the like, in accordance with the particle diameter, the particle diameter distribution and the like which are required for the shot media. Or, the powders based on zirconia are converted into a slurry and are granulated by a spray and drying method such as the spray granulating method and the like. The provided spherical green body is sintered at a temperature of 1,300° to 1,600° C.

Further, the compressive strength of the sintered body can further be promoted, when the shot media based on zirconia obtained by the primary sintering is treated by a hot isostatic press (HIP). Further, when the shape is spherical, it is possible to promote the compressive strength or the impact strength of the sintered body, by polishing the surface by a barrel polishing and the like after sintering, such that defects or cracks the size of which exceeds 10 μm are not present on the surface or in the vicinity there of.

As stated above, the invented shot media based on zirconia is excellent in the impact power, the polishing power and the grinding power, and yet the roughness and the strain of the surface of the work are small, and the shot media based on zirconia is excellent in the wear resistance, the mechanical strength, the hardness and the like. Therefore, the reclamation and the reuse thereof are easy.

It is possible to perform the shot blasting treatment by using this shot media based on zirconia, as in removing the old sprayed coating of ceramic which is hard to remove without impairing the surface of the substrate and enhancing the strain, in the conventional technology, or as in surface preparation without generation of the rust.

Further, it is possible to perform not only the surface treatment for providing the wear resistance on a mirror finished surface of alloy, and also the shot peening treatment with a purpose of the ornament effect of the mirror finished face of a product of stainless steel or an aluminum alloy, or the surface of resin, as a substitute of buffing.

It is possible to perform a refined treatment by using this shot media based on zirconia, which can meet severe requirements with respect to a complicated shape of the work or an appearance-oriented surface property such as the accuracy in surface roughness, the dimensional accuracy, the reflectivity, the gloss and the like of a finished face.

The invented shot media can be applied in the following fields.

Automobile components and engine parts of a variety of vehicles such as front axle beam, wheel cap, leaf spring, crank shaft, piston ring, rocker arm, cam shaft, gear wheel parts, cylinder, steering knuckle, spiral spring, connecting rod and the like; metal parts for aircraft and its engine parts such as turbine blade of a jet engine; ships equipment and its engine parts such as screw and the like, reactors in chemical and petrochemical plants; the equipment associated machine as in pressing; machine tool such as index head, center, chuck and the like; armamentarium such as scalpel, pincette, injection needle and the like; artificial aggregate such as stem; dental instrument such as teeth, fang;, which are the targets of shot peening with a purpose of prolonging the fracture limit due to fatigue, stress corrosion or intergranular corrosion of metal such as various stainless steels and their faces of weld.

Household or business kitchen utensils such as dinner set, spoon, fork, knife, pan, iron pot, frying pan and the like; industrial or general cutlery such as stainless knife, cutter, hitting cutlery and the like; house equipment such as system kitchen, scullery, kitchen utensil, labatory-dressing table; house material such as lumber room, garage, gate, and fence; indoor and outdoor ornaments such as decoration plate, wall decorations and door plate; electric appliances such as television set, videocassette recorder, electric refrigerator, washing machine and dryer; office automation equipment such as word processor and personal computer; heating and cooling equipment such as air conditioner and stove; smoking parts such as cigarette lighter and ashtray; optical instrument such as camera and microscope; life and leisure equipment such as golf equipment, camping outfit, bicycle, motor cycle, automobile, yacht, motor boat, and suit case; jewel such as wrist watch, gold and silver plate, ring, necklace, champion cup, shield, medal and badge; promotion of merchandise value or design by forming a mat finished surface on surfaces of metal, resin, glass, wood, stone, ceramics and the like, as in the inner face of a food of lighting fixture and labor saving in the mat finished surface forming and in an after treatment process; deburring or surface cleaning of a variety of machine working parts and metal, resin, ferrite, ceramics product or the like which is formed by extrusion molding, slip casting, injection molding or the like; surface roughening for adhering adhesives, paints, glaze and a thermal spray material or for promoting their adhesion effects; removing of contamination on a soldered face, a hardening coat after electrical-discharge machining, steel after quenching, weld burr, rust, old spray deposit, plated coat, painted film, enamel and the like; internal cleaning of an internal pressure vessel such as various cylinders; and polishing, grinding or blast cleaning before repair of various dies and die parts, automobile parts, various vehicle parts or machine parts.

EXAMPLES

A specific explanation will be given to the present invention by Examples and Comparative Examples as follows.

This invention is not restricted by these Examples.

EXAMPLES 1 to 6, COMPARATIVE EXAMPLES 1 to 4

Powders based on zirconia having the property shown in Table 1 were provided by the hydrolysis method from a raw material of zirconium oxychloride solution having the concentration of 50 g/l, which were added with yttria so that the converted mole ratio of $ZrO_2/Y_2O_3$ became as shown in Table 1. The powders were ground by dry-grinding, nuclear particles for granulation having the size of approximate 0.1 mm were provided by an agitation granulator, the nuclear particles for granulation were grown further by the agitation granulator, the particle size distribution of the grown granule having a size including approximately sintering shrinkage was controlled by a sieve of nominal sizes of apertures of 2.83 to 0.020 mm thereby providing a formed spherical green body, and a sintered body based on zirconia was provided by sintering under the conditions shown in Table 2. In Examples 3 and 4 and Comparative Example 4, the HIP treatment was performed for one hour under a pressure of 150 MPa at a temperature of 1,500° C. The sintered body provided as above was screened by a sieve of nominal sizes of apertures of 2.36 mm and the over-sieve portion was removed and was provided for the shot peening and shot blasting tests.

EXAMPLES 7 to 9, COMPARATIVE EXAMPLE 5

The powders based on zirconia provided by adding high purity alumina powders (Sumitomo Chemical Co., Ltd. AKP-30) having the mean particle diameter of 0.3 to 0.5 $\mu$m to the powders based on zirconia obtained by Example 1 or the like, at the weight % shown in Table 1, which were ground and mixed by wet-grinding employing a vibrating ball mill, dried and ground by dry-grinding. A sintered body based on zirconia was provided under the same condition shown in Example 1 or the like, other than the above condition. In Examples 8 and 9, the HIP treatment was performed under the same condition as in Example 3 and the like. The products were provided for the shot peening and the shot blasting tests.

EXAMPLE 10

As granulation, nuclear particles for granulation having a size of approximately 0.1 mm provided by an agitation granulator were grown by a marumerizer, and the particle size distribution of the granules having a size including approximately sintering shrinkage was controlled by a sieve of nominal sizes of apertures of 2.83 to 0.020 mm thereby obtaining formed spherical green bodies. Other than that, the test was performed under the condition shown in Examples 1 to 6 and Comparative Examples 1 to 4.

EXAMPLES 11 to 13, COMPARATIVE EXAMPLE 6

As granuled powder for sintering, granules which were granulated and dried by a spray dryer from a slurry based on zirconia converted from the powders based on zirconia obtained by Example 1 and the like, were employed. In Example 13, the granules were sintered under the same conditions as in Example 3 or the like and the HIP treatment was performed. Other than that, the test was performed under the same condition as in Examples 1 to 6 and Comparative Examples 1 to 4.

EXAMPLES 14 and 15

As granuled powder for sintering, granules which were granulated and dried by a spray dryer from a slurry based on zirconia converted from the powders based on zirconia including alumina which was obtained under the same condition as in Example 7 or the like, were employed. In Example 15, bubbles in the slurry were removed by an antiforming agent, and the slurry was supplied for granulation and drying. Other than that, the test was performed under the same condition as in Examples 1 to 6 and Comparative Examples 1 to 4.

EXAMPLES 16 to 22, COMPARATIVE EXAMPLES 7 to 12

The powders based on zirconia provided by Example 1 or the like were added with other components shown in Table 1 by the weight % shown therein, which were ground by wet-grinding for 8 hours by an attrition mill, and dried thereby providing powders based on zirconia. Nuclear particles for granulation having a size of approximately 0.1 mm were provided by an agitation granulator, which were further grown to spherical green body having a size including approximately sintering shrinkage by a tumbling granulator, and sintered under the conditions shown in Table 2 thereby providing sintered body based on zirconia. The sintered body based on zirconia is provided with gloss on its surface by barrel polishing and is finished until large defects were not found on its surface by observing an optical microscope having magnification of 50, thereby making a shot agent. The provided shot agent was provided for the measurement of the impact strength and the shot peening and the shot blasting tests.

COMPARATIVE EXAMPLES 13 and 14

The shot peening and the shot blasting tests were performed with respect to a spherical body of sintered alumina (Naigai Ceramics Co., Ltd., aluminite "A" ball; density of sintered body: 3.8 g/cm$^3$; mean particle diameter: 1.9 mm) (Comparative Example 13) and glass beads (Union Co., Ltd. UB-810L; mean particle diameter; 145 $\mu$m) (Comparative Example 14).

In the former case, there were destructed spherical body of sintered alumina by performing repetitive shot operation, and it was observed that the density of the sintered body is low. However, the deformation depth of the surface of the work is small and the surface roughness was large. In the latter case, the beads were destructed by a single shot operation to a degree whereby the beads could not repetitively utilized.

The property of zirconia powders for making shot media in the above respective examples is shown in Table 1, the sintering condition, Table 2, the property of the shot media, in Tables 3 and 4, and the results of the shot peening and the shot blasting tests employing the shot media, in Table 5.

The particle diameter distribution of the shot media (sintered bodies under a sieve of nominal sizes of apertures of 2.36 mm) was measured by laminating sieves of nominal sizes of apertures of 2.36, 2.00, 1.70, 1.40, 1.18, 1.00, 0.850, 0.710, 0.600, 0.500, 0.425, 0.355, 0.300, 0.250, 0.212, 0.200, 0.180, 0.150, 0.125, 0.100, 0.090, 0.075, 0.063, 0.053, 0.045, 0.038, 0.025 and 0.020 (unit: mm) in an order from the smallest nominal sizes of apertures successively on a saucer, and by shaking them by a ro-tap shaker for 5 minutes. Among the sieves containing the screened samples, the nominal sizes of apertures of a sieve on top of the uppermost sieve were determined as an upper limit of the particle diameter distribution, and those of the lowermost sieve was determined to be the lower limit of the particle diameter distribution.

The shot peening test was performed by employing a pneumatic nozzle type in use of compressed air having the gauge pressure of 4 kgf/cm$^2$, and the treatment was performed repetitively for 3 times wherein the shot time in a single treatment was 120 minutes, with the work of stainless steel (type 316) having the thickness of 5 mm. The size reduction ratio was calculated as follows. A sieve of nominal sizes of apertures of 0.020 mm was laminated on the saucer, and a sieve of nominal sizes of apertures corresponding to approximately ⅓ of a mean value of the upper limit and lower limit of the particle diameter distribution of shot media before the shot operation, on which 100 g of shot media after the shot operation was supplied, and which was screened by vibrating it for 5 minutes by the ro-tap shaker, the screened weight was put into the following equation and the size reduction rate was calculated thereby.

Size reduction ratio (wt %) = $\{A/(100-B)\} \times 100$ where A is a quantity of sample in the sieve of nominal sizes of apertures of 0.020 mm (g) and B, the quantity of sample in the saucer (g).

Further, the depth of the surface deformation and the surface roughness (Ra: mean roughness of center line) after shot-peening the surface of the work, were measured.

The shot blasting test was performed employing an examination piece which was provided by plasma-spraying powders of partially stabilized zirconia (TOSOH CORPORATION TZ-3Y: $Y_2O_3$: 3 mol %) on a blast-treated carbon steel (SS41:50 mm × 50 mm × 5 mm) until the film thickness was 200 μm. The shot blasting test was performed by shot-blasting the shot media bases on zirconia to the examination piece from a nozzle having the bore of 6 mm by compressed air having the gauge pressure of 5 kgf/cm² under the condition of the shot distance of 30 cm and the shot angle of 60°, the grinding condition of the sprayed face of the examination piece was observed and the size reduction ratio of the shot media was provided similar to the shot peening test.

TABLE 1

| | $ZrO_2/Y_2O_3$ mole ratio | Other component Component | Weight % | Mean particle diameter (μm) | BET specific surface area (m²/g) |
|---|---|---|---|---|---|
| Example | | | | | |
| 1 | 97.1/2.9 | — | — | 1.0 | 6.0 |
| 2 | 97.1/2.9 | — | — | 1.0 | 6.0 |
| 3 | 97.0/3.0 | — | — | 0.6 | 12.3 |
| 4 | 97.0/3.0 | — | — | 0.7 | 7.2 |
| 5 | 97.0/3.0 | — | — | 0.7 | 7.2 |
| 6 | 97.0/3.0 | — | — | 0.7 | 7.1 |
| 7 | 97.1/2.9 | $Al_2O_3$ | 1.0 | 1.0 | 6.2 |
| 8 | 97.1/2.9 | $Al_2O_3$ | 2.0 | 1.0 | 6.4 |
| 9 | 97.1/2.9 | $Al_2O_3$ | 20 | 0.7 | 10.1 |
| 10 | 97.0/3.0 | — | — | 0.7 | 7.1 |
| 11 | 97.1/2.9 | — | — | 0.7 | 15.0 |
| 12 | 97.0/3.0 | — | — | 0.7 | 15.2 |
| 13 | 97.0/3.0 | — | — | 0.7 | 15.2 |
| 14 | 97.1/2.9 | $Al_2O_3$ | 20 | 0.7 | 10.1 |
| 15 | 97.1/2.9 | $Al_2O_3$ | 20 | 0.7 | 10.1 |
| 16 | 98.4/1.6 | MgO | 5.0 | 0.9 | 6.5 |
| 17 | 97.8/2.2 | — | — | 0.9 | 6.5 |
| 18 | 97.8/2.2 | $CeO_2$ | 2.0 | 0.9 | 6.5 |
| 19 | 97.3/2.7 | — | — | 0.9 | 6.5 |
| 20 | 97.3/2.7 | $Al_2O_3$ | 1.0 | 0.9 | 6.5 |
| 21 | 97.3/2.7 | $Al_2O_3$ | 10 | 0.9 | 6.5 |
| 22 | 96.5/3.5 | $Al_2O_3$ | 0.4 | 0.9 | 6.5 |
| Comparative Example | | | | | |
| 1 | 97.1/2.9 | — | — | 0.4 | 15.5 |
| 2 | 97.1/2.9 | — | — | 2.5 | 3.0 |
| 3 | 97.0/3.0 | — | — | 0.7 | 7.2 |
| 4 | 97.1/2.9 | — | — | 0.4 | 15.5 |
| 5 | 96.9/2.9 | $Al_2O_3$ | 20 | 0.7 | 10.1 |
| 6 | 100/0 | — | — | 0.7 | 16.0 |
| 7 | 97.3/2.7 | $Al_2O_3$ | 35 | 0.9 | 6.5 |
| 8 | 97.3/2.7 | — | — | 0.9 | 6.5 |
| 9 | 97.3/2.7 | — | — | 0.9 | 6.5 |
| 10 | 97.3/2.7 | CaO | 5.0 | 0.9 | 6.5 |
| 11 | 95.0/5.0 | — | — | 0.9 | 6.5 |
| 12 | 98.8/2.2 | MgO | 6.0 | 0.9 | 6.5 |

TABLE 2

| | Sintering temperature (°C.) | Sintering time (hr) | HIP treatment | Particle diameter distribution of shot media sample (mm) |
|---|---|---|---|---|
| Example | | | | |
| 1 | 1450 | 2 | No | 0.425–0.600 |
| 2 | 1400 | 2 | Yes | 0.425–0.600 |
| 3 | 1400 | 2 | No | 1.70–2.36 |
| 4 | 1400 | 2 | Yes | 1.70–2.36 |
| 5 | 1400 | 2 | No | 1.70–2.36 |
| 6 | 1400 | 2 | No | 0.850–1.18 |
| 7 | 1300 | 2 | No | 0.425–0.600 |
| 8 | 1350 | 2 | Yes | 0.850–1.18 |
| 9 | 1350 | 2 | Yes | 0.850–1.18 |
| 10 | 1400 | 2 | No | 1.70–2.36 |
| 11 | 1400 | 2 | No | 0.045–0.150 |
| 12 | 1300 | 2 | No | 0.025–0.075 |
| 13 | 1300 | 2 | Yes | 0.025–0.075 |
| 14 | 1300 | 2 | No | 0.038–0.100 |
| 15 | 1300 | 2 | No | 0.038–0.100 |
| 16 | 1450 | 3 | No | 0.125–0.200 |
| 17 | 1370 | 3 | No | 0.125–0.200 |
| 18 | 1370 | 3 | No | 0.125–0.200 |
| 19 | 1370 | 3 | No | 0.125–0.200 |
| 20 | 1370 | 3 | No | 0.125–0.200 |
| 21 | 1400 | 3 | No | 0.125–0.200 |
| 22 | 1400 | 3 | No | 0.125–0.200 |
| Comparative Example | | | | |
| 1 | 1400 | 2 | No | 1.70–2.36 |
| 2 | 1600 | 2 | No | 1.70–2.36 |
| 3 | 1250 | 2 | No | 1.70–2.36 |
| 4 | 1400 | 2 | Yes | 0.425–0.600 |
| 5 | 1600 | 2 | No | 0.850–1.18 |
| 6 | 1400 | 2 | No | 0.025–0.075 |
| 7 | 1450 | 3 | No | 0.125–0.200 |
| 8 | 1600 | 3 | No | 0.125–0.200 |
| 9 | 1250 | 3 | No | 0.125–0.200 |
| 10 | 1550 | 3 | No | 0.125–0.200 |
| 11 | 1550 | 3 | No | 0.125–0.200 |
| 12 | 1500 | 3 | No | 0.125–0.200 |
| 13 | — | — | No | 1.000–2.36 |
| 14 | — | — | No | 0.125–0.180 |

TABLE 3

| | Relative density of sintered body (%) | Theoretical density (g/cm³) | Sphericity | Content of tetragonal phase (mole %) |
|---|---|---|---|---|
| Example | | | | |
| 1 | 99.3 | 6.10 | 0.97 | 95 |
| 2 | 99.3 | 6.10 | 0.97 | 95 |
| 3 | 99.7 | 6.10 | 0.96 | 96 |
| 4 | 99.0 | 6.10 | 0.97 | 96 |
| 5 | 98.4 | 6.10 | 0.93 | 95 |
| 6 | 98.9 | 6.10 | 0.93 | 96 |
| 7 | 99.0 | 6.07 | 0.98 | 96 |
| 8 | 99.0 | 6.04 | 0.98 | 97 |
| 9 | 98.4 | 5.51 | 0.93 | 96 |
| 10 | 99.0 | 6.10 | 0.97 | 96 |
| 11 | 98.8 | 6.10 | 0.87 | 95 |
| 12 | 98.5 | 6.10 | 0.95 | 96 |
| 13 | 99.3 | 6.10 | 0.96 | 95 |
| 14 | 95.5 | 5.51 | 0.97 | 95 |
| 15 | 98.2 | 5.51 | 0.97 | 96 |
| 16 | 96.0 | 5.97 | 0.97 | 85 |
| 17 | 98.0 | 6.10 | 0.97 | 96 |
| 18 | 99.0 | 6.12 | 0.96 | 100 |
| 19 | 98.0 | 6.10 | 0.97 | 95 |
| 20 | 99.0 | 6.07 | 0.97 | 96 |
| 21 | 97.0 | 5.79 | 0.96 | 93 |
| 22 | 97.0 | 6.09 | 0.97 | 87 |
| Comparative Example | | | | |
| 1 | 96.7 | 6.10 | 0.83 | 95 |
| 2 | 94.3 | 6.10 | 0.97 | 95 |
| 3 | 88.5 | 6.10 | 0.95 | 95 |

TABLE 3-continued

|   | Relative density of sintered body (%) | Theoretical density (g/cm³) | Sphericity | Content of tetragonal phase (mole %) |
|---|---|---|---|---|
| 4 | 96.7 | 6.10 | 0.83 | 96 |
| 5 | 94.3 | 5.51 | 0.97 | 96 |
| 6 | 76.6 | 5.90 | 0.93 | 0 |
| 7 | 96.0 | 5.14 | 0.96 | 96 |
| 8 | 97.0 | 6.10 | 0.97 | 90 |
| 9 | 92.0 | 6.10 | 0.94 | 92 |
| 10 | 96.0 | 5.96 | 0.97 | 96 |
| 11 | 99.0 | 6.01 | 0.95 | 60 |
| 12 | 97.0 | 5.95 | 0.97 | 50 |
| 13 | 95.5 | 3.98 | 0.91 | — |
| 14 | 99.0 | 2.45 | 0.97 | — |

TABLE 4

|   | Compressive strength (kgf/mm²) | Vickers hardness (kgf/mm²) | Mean grain size (μm) | Impact strength/$D^{-0.95}$ |
|---|---|---|---|---|
| Example |  |  |  |  |
| 1 | 45.0 | 1225 | 0.7 |  |
| 2 | 90.5 | 1320 | 0.7 |  |
| 3 | 66.2 | 1250 | 0.5 |  |
| 4 | 85.5 | 1295 | 0.7 |  |
| 5 | 67.0 | 1256 | 0.5 |  |
| 6 | 57.0 | 1221 | 0.5 |  |
| 7 | 46.4 | 1353 | 0.5 |  |
| 8 | 93.5 | 1355 | 0.7 |  |
| 9 | 95.0 | 1256 | 0.7 |  |
| 10 | 65.5 | 1282 | 0.5 |  |
| 11 | ≧200 | 1200 | 0.5 |  |
| 12 | 175.5 | 1200 | 0.5 |  |
| 13 | ≧250 | 1220 | 0.4 |  |
| 14 | 65.5 | 1120 | 0.5 |  |
| 15 | 96.7 | 1180 | 0.5 |  |
| 16 | 50.0 | 1150 | 0.7 | 8 |
| 17 | 70.0 | 1250 | 0.3 | 13 |
| 18 | 60.0 | 1200 | 0.5 | 9 |
| 19 | 75.0 | 1300 | 0.4 | 12 |
| 20 | 75.0 | 1330 | 0.3 | 12 |
| 21 | 50.0 | 1420 | 0.5 | 7.5 |
| 22 | 65.0 | 1280 | 0.6 | 10 |
| Comparative Example |  |  |  |  |
| 1 | 61.4 | 1145 | 0.5 |  |
| 2 | 39.5 | 1012 | 1.2 |  |
| 3 | 35.0 | 950 | 0.4 |  |
| 4 | 61.4 | 1145 | 0.9 |  |
| 5 | 39.5 | 1212 | 1.2 |  |
| 6 | 5.8 | Unmeasurable | 0.9 |  |
| 7 | 70.0 | 1550 | 0.7 | 6 |
| 8 | 65.0 | 1220 | 1.1 | 10 |
| 9 | 45.0 | 1150 | 0.2 | 6.5 |
| 10 | 40.0 | 1100 | 1.5 | 5 |
| 11 | 40.0 | 1100 | 1.8 | 5 |
| 12 | 50.0 | 1050 | 1.3 | 7 |
| 13 | 8.5 | 1554 | — |  |
| 14 | 20.0 | — | — |  |

TABLE 5

|   | Peening test | | | Blasting test | |
|---|---|---|---|---|---|
|   | Surface deformation (mm) | Surface roughness (μm) | Size reduction ratio (%) | State of examination piece *) | Size reduction ratio (%) |
| Example |  |  |  |  |  |
| 1 | 0.13 | 1.6 | 3.5 | ○ | 2.0 |
| 2 | 0.15 | 1.6 | 2.0 | ○ | 0.8 |
| 3 | 0.24 | 3.8 | 3.5 | Δ | 2.1 |
| 4 | 0.25 | 4.5 | 2.2 | Δ | 1.3 |
| 5 | 0.27 | 4.8 | 3.5 | Δ | 1.8 |
| 6 | 0.18 | 2.5 | 3.4 | ○ | 2.0 |
| 7 | 0.12 | 1.8 | 3.0 | ○ | 1.8 |
| 8 | 0.18 | 2.3 | 2.5 | ○ | 1.0 |
| 9 | 0.20 | 2.5 | 2.5 | ○ | 1.1 |
| 10 | 0.22 | 3.6 | 2.3 | Δ | 2.2 |
| 11 | 0.04 | 0.3 | 3.2 | ○ | 2.2 |
| 12 | 0.04 | 0.2 | 4.0 | ○ | 2.4 |
| 13 | 0.05 | 0.3 | 3.2 | ○ | 2.2 |
| 14 | 0.05 | 0.2 | 4.0 | ○ | 3.1 |
| 15 | 0.05 | 0.3 | 3.8 | ○ | 3.3 |
| 16 | 0.12 | 0.8 | 4.0 | ○ | 3.3 |
| 17 | 0.14 | 0.8 | 3.0 | ○ | 2.5 |
| 18 | 0.10 | 0.8 | 3.2 | ○ | 2.5 |
| 19 | 0.11 | 1.0 | 3.0 | ○ | 2.4 |
| 20 | 0.13 | 1.0 | 2.8 | ○ | 2.4 |
| 21 | 0.11 | 0.9 | 2.1 | ○ | 1.5 |
| 22 | 0.11 | 1.8 | 2.5 | ○ | 2.0 |
| Comparative Example |  |  |  |  |  |
| 1 | 0.30 | 8.2 | 4.5 | X | 3.0 |
| 2 | 0.20 | 6.2 | 7.0 | X | 4.5 |
| 3 | 0.24 | 4.5 | 8.5 | Δ | 5.5 |
| 4 | 0.30 | 7.8 | 3.8 | X | 2.1 |
| 5 | 0.35 | 5.5 | 3.5 | X | 2.2 |
| 6 | 0.04 | 0.3 | 65.0 | ○ | 45.5 |
| 7 | 0.15 | 1.2 | 16.5 | ○ | 13.4 |
| 8 | 0.12 | 0.8 | 9.3 | ○ | 7.5 |
| 9 | 0.12 | 0.8 | 18.0 | ○ | 15.4 |
| 10 | 0.10 | 0.8 | 12.0 | ○ | 10.3 |
| 11 | 0.10 | 0.8 | 14.5 | ○ | 12.2 |
| 12 | 0.08 | 0.6 | 10.8 | ○ | 9.5 |
| 13 | 0.08 | 4.2 | 32.5 | Δ | 26.4 |
| 14 | 0.12 | 1.9 | 95.0 | ○ | 90.0 |

*) State of examination piece
○: Sprayed coating was removed and the surface of examination piece remains unchanged.
Δ: Sprayed coating was removed and the surface of examination piece is a little rugged.
X: Sprayed coating was removed and the surface of examination piece is rugged.

What is claimed is:

1. A method of treating hard surfaces by impact which comprises impacting them with zirconia-based shot media composed of a sintered body of partially stabilized zirconia containing not less than 70 mol % tetragonal zirconia in which the substantial total quantity of shot media is trader a sieve size of 2.36 mm apertures, said sintered body having a theoretical density of not less than 5.5 g/cm³, a mean relative density against the theoretical density of not less than 95%, a mean grain size of not more than 1.0 μm, and a mean Vickers hardness of not less than 1,000 kgf/mm².

2. The method according to claim 1, wherein the sintered body of partially stabilized zirconia is spherical, of which mean compressive strength is not less than 40 kgf/mm², and of which mean sphericity is not less than 0.9.

3. The method according to claim 1, wherein a substantial total quantity of the sintered body of partially stabilized zirconia is over a sieve of normal sizes of apertures of 0.02 mm and under a sieve of normal sizes of apertures of 2 mm.

4. The method according to claim 1, wherein the mean relative density against the theoretical density of the sintered body of partially stabilized zirconia is not less than 97%.

5. The method according to claim 1, wherein the sintered body of partially stabilized zirconia is composed of $ZrO_2$ and $Y_2O_3$ and the mole ratio of $ZrO_2/Y_2O_3$ is 98.5/1.5 to 96/4.

6. The method according to claim 1, wherein the sintered body of partially stabilized zirconia is spherical, of which diameter is designated by D mm, and a mean impact strength of the sintered body based on zirconia is not less than $7 \times D^{-0.95}$ kgf/mm².

7. The method according to claim 5, wherein the sintered body of partially stabilized zirconia contains 0.5 to 8.3% $SiO_2$ and 0.05 to 20% $Al_2O_3$.

* * * * *